US009982687B2

(12) United States Patent
Mitsuda et al.

(10) Patent No.: US 9,982,687 B2
(45) Date of Patent: May 29, 2018

(54) COMPRESSOR

(71) Applicant: KABUSHIKI KAISHA TOYOTA JIDOSHOKKI, Aichi-ken (JP)

(72) Inventors: Satoru Mitsuda, Aichi-ken (JP); Ryo Umeyama, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 241 days.

(21) Appl. No.: 15/079,455

(22) Filed: Mar. 24, 2016

(65) Prior Publication Data
US 2016/0281740 A1    Sep. 29, 2016

(30) Foreign Application Priority Data
Mar. 27, 2015 (JP) .................. 2015-066139

(51) Int. Cl.
| H02K 9/00 | (2006.01) |
| F04D 29/58 | (2006.01) |
| F04D 25/06 | (2006.01) |
| H02K 9/19 | (2006.01) |
| H02K 7/14 | (2006.01) |
| F04D 17/10 | (2006.01) |
| H02K 5/20 | (2006.01) |

(52) U.S. Cl.
CPC ......... *F04D 29/5806* (2013.01); *F04D 17/10* (2013.01); *F04D 25/0606* (2013.01); *H02K 5/20* (2013.01); *H02K 7/14* (2013.01); *H02K 9/19* (2013.01); *F05D 2260/213* (2013.01)

(58) Field of Classification Search
CPC ....... H02K 7/14; F04D 29/5806; F04D 17/10; F04D 25/0606

USPC ............... 310/52, 54, 58, 59, 60 R, 60 A, 64
See application file for complete search history.

(56) References Cited

U.S. PATENT DOCUMENTS

| 5,605,045 A * | 2/1997 | Halimi | ................... F01D 5/085 |
| | | | 310/52 |
| 2003/0075996 A1 * | 4/2003 | Yoshida | ................... H02K 1/20 |
| | | | 310/58 |

(Continued)

FOREIGN PATENT DOCUMENTS

| JP | S52-121810 U | 9/1977 |
| JP | 11-107986 | 4/1999 |

(Continued)

*Primary Examiner* — Hanh Nguyen
(74) *Attorney, Agent, or Firm* — Greenblum & Bernstein, P.L.C.

(57) ABSTRACT

A compressor is provided that comprises; a compression mechanism compressing a fluid; a motor driving the compression mechanism; and a housing that houses the compression mechanism and the motor. The compressor includes a low-temperature fluid passage forming unit having a surface forming a low-temperature fluid passage in which a low-temperature fluid flows and provided in the housing so as to cool the motor, and an oil passage forming unit having a surface forming an oil passage through which oil supplied into the housing flows. At least a part of the oil passage forming unit is arranged so as to face the low-temperature fluid passage forming unit with an interposed portion interposed therebetween such that the oil is cooled by heat exchange with the low-temperature fluid.

9 Claims, 6 Drawing Sheets

(56) References Cited

U.S. PATENT DOCUMENTS

2008/0185924 A1* 8/2008 Masoudipour ........... H02K 5/20
                                                              310/54
2015/0207386 A1* 7/2015 Garrard ................... H02K 9/19
                                                              310/54

FOREIGN PATENT DOCUMENTS

| JP | 2001-200791 | 7/2001 |
| JP | 2006-63881  | 3/2006 |

* cited by examiner

COMPRESSOR

This nonprovisional application is based on Japanese Patent Application No. 2015-066139 filed on Mar. 27, 2015, with the Japan Patent Office, the entire contents of which are hereby incorporated by reference.

BACKGROUND OF THE INVENTION

Field of the Invention

The present invention relates to a compressor including a motor.

Description of the Background Art

A commonly-used compressor incorporates a motor and a compression mechanism. The rotating force generated by the motor is transmitted to the compression mechanism via a rotation shaft and the like. As disclosed in Japanese Patent Laying-Open No. 11-107986, oil is supplied to devices (a compression mechanism, a speed increasing machine, and the like) incorporated in the compressor. The oil is caused to flow through an oil passage for lubrication of each device, cooling of each device, and the like.

SUMMARY OF THE INVENTION

A compressor according to an aspect of the present invention includes: a compression mechanism compressing a fluid; a motor driving the compression mechanism; and a housing that houses the compression mechanism and the motor. The compressor includes a low-temperature fluid passage forming unit having a surface forming a low-temperature fluid passage in which a low-temperature fluid flows and provided in the housing so as to cool the motor; and an oil passage forming unit having a surface forming an oil passage through which oil supplied into the housing flows. At least a part of the oil passage forming unit is arranged so as to face the low-temperature fluid passage forming unit with an interposed portion interposed therebetween such that the oil is cooled by heat exchange with the low-temperature fluid.

A compressor according to another aspect of the present invention includes: a compression mechanism compressing a fluid; a motor driving the compression mechanism; and a housing that houses the compression mechanism and the motor. The compressor includes: a low-temperature fluid passage forming unit having a surface forming a low-temperature fluid passage in which a low-temperature fluid flows and provided in the housing so as to cool the motor; an oil passage forming unit having a surface forming an oil passage through which oil supplied into the housing flows; and an oil cooler cooling the oil that flows through the oil passage. The oil cooler is provided in the housing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
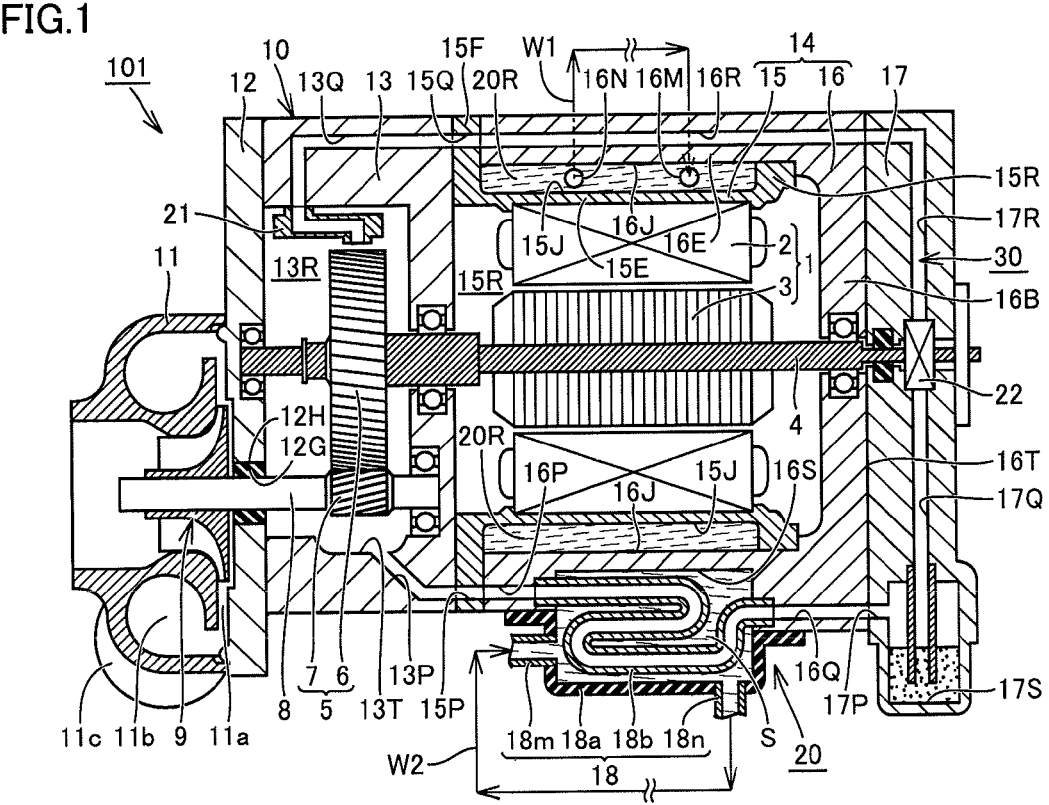
FIG. 1 is a cross-sectional view showing a compressor in the first embodiment.

A compressor in each embodiment will be hereinafter described with reference to the accompanying drawings. The compressor described below can be used in applications for supplying a compressed fluid to a fuel cell device and an air-conditioner, for example. In the following description, the same or corresponding components are designated by the same reference characters, and description thereof may not be repeated.

First Embodiment

Figure 2:
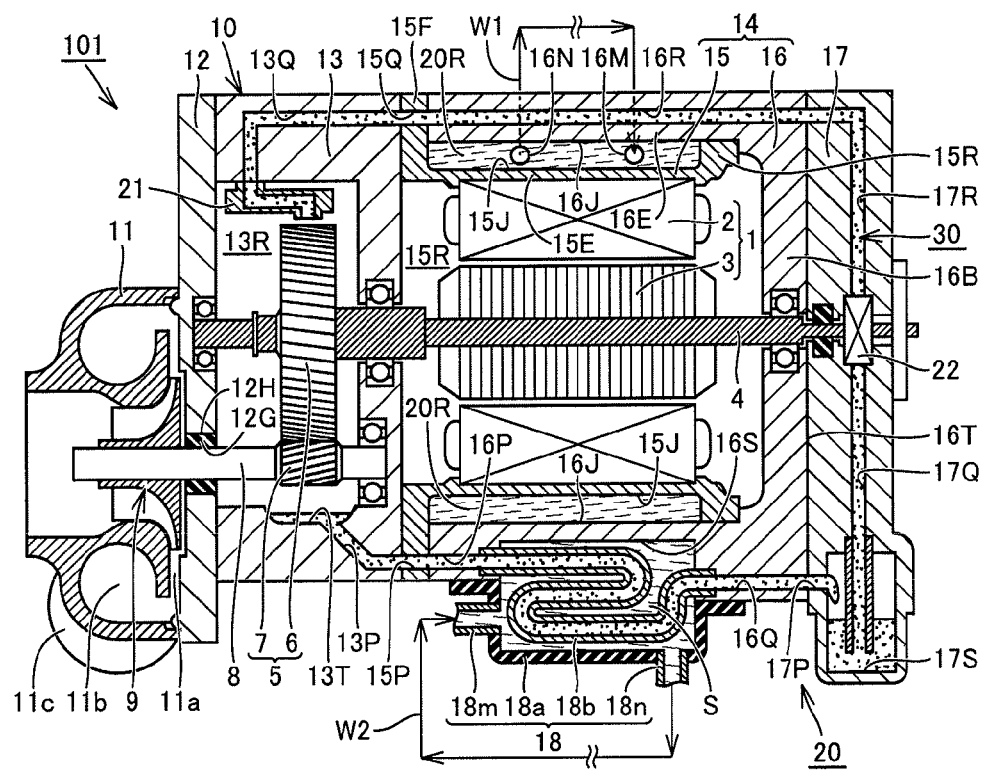
FIG. 2 is a cross-sectional view for illustrating the operation of the compressor in the first embodiment.

Referring to FIGS. 1 and 2, a compressor 101 in the first embodiment will be hereinafter described. FIG. 1 is a cross-sectional view showing the compressor 101. FIG. 2 is a cross-sectional view for illustrating the operation of the compressor 101.

As shown in FIG. 1, the compressor 101 has a housing 10 that houses a motor 1, a compression mechanism (an impeller 9), and a speed increasing machine 5. The housing 10 includes a compression mechanism housing 11 that houses the compression mechanism, a speed increasing machine housing 13 that houses the speed increasing machine 5, a motor housing 14 that houses the motor 1, and a rear housing 17.

The compression mechanism housing 11 has an inlet port and a compression chamber that is in communication with the inlet port. The compression chamber houses the impeller 9 as a compression mechanism. A funnel-shaped inner wall surface is formed around the impeller 9. This inner wall surface is in communication with a cochlea-shaped volute 11b through a diffuser 11a disposed on the radially outside of the impeller 9. The fluid (air) suctioned through the inlet port by rotation of the impeller 9 is supplied to the diffuser 11a while being compressed by the centrifugal force of the impeller 9, and then compressed therein. The fluid compressed by the diffuser 11a is fed to an exhaust port 11c through the volute 11b, and supplied to a prescribed operation mechanism that is not shown.

A partition wall 12 is formed in a plate shape, and provided between the compression mechanism housing 11 and the speed increasing machine housing 13. The compression mechanism housing 11 and the partition wall 12 are joined to each other, so that an impeller chamber housing the impeller 9, the diffuser 11a and the volute 11b are partitioned. Furthermore, the partition wall 12 and the bottomed cylindrical speed increasing machine housing 13 are joined to each other, so that a speed increasing machine chamber 13R housing the speed increasing machine 5 is partitioned.

The speed increasing machine 5 includes a large-diameter roller 6 that is pivotally supported by a low-speed rotation shaft 4 serving as a rotation shaft of the motor 1 and a small-diameter roller 7 that is pivotally supported by a high-speed rotation shaft 8. In addition, the speed increasing machine 5 is not limited to a roller-type, but may be of a gear type. The partition wall 12 is provided with a through hole 12H, through which the high-speed rotation shaft 8 is inserted.

The high-speed rotation shaft 8 pivotally supports the impeller 9. In other words, the speed increasing machine 5 is drive-coupled to the motor 1 via the low-speed rotation shaft 4, and transmits the motive power of the motor 1 to the compression mechanism (impeller 9) through the rollers 6 and 7 and the high-speed rotation shaft 8. A shaft seal 12G (a bearing having a sealing function) is provided between the inner circumferential surface having the through hole 12H and the high-speed rotation shaft 8. An oil feeding unit 21 formed of an injection nozzle and the like is also provided within the speed increasing machine chamber 13R (further details of the oil feeding unit 21 will be described later).

(Low-Temperature Fluid Passage Forming Unit 20)

The low-temperature fluid passage forming unit 20 has a surface forming the low-temperature fluid passage 20R in which a low-temperature fluid flows and is provided in the motor housing 14 so as to cool the motor 1, which will be hereinafter more specifically described.

(Motor Housing 14)

The motor housing 14 houses the motor 1. The motor housing 14 of the present embodiment includes an outer housing 16 and an inner housing 15 that is disposed between the outer housing 16 and the motor 1.

The inner housing 15 is formed of a cylindrical portion 15E formed in a cylindrical shape and circular ring portions 15F and 15R provided at both ends, respectively, of the cylindrical portion 15E in the axial direction. The outer housing 16 is formed of a disc-shaped bottom wall 16B and a cylindrical sidewall 16E that is vertically arranged from the outer circumferential edge of the bottom wall 16B. This outer housing 16 is formed in a bottomed cylindrical shape. The inner housing 15 and the outer housing 16 are formed as separate bodies and joined to each other in the present embodiment, but may be formed integrally as one unit.

The circular ring portion 15F of the inner housing 15 is provided on one of two ends of the cylindrical portion 15E in the axial direction, and the circular ring portion 15F protrudes from an outer circumferential surface 15J of the one end side to the radially outside of the cylindrical portion 15E. In other words, the circular ring portion 15F is formed in a circular ring shape. The circular ring portion 15F is sandwiched between the speed increasing machine housing 13 and the outer housing 16 in the axial direction of the cylindrical portion 15E (the axial direction of the low-speed rotation shaft 4).

The circular ring portion 15R of the inner housing 15 is provided on the other one of the two ends of the cylindrical portion 15E in the axial direction, and the circular ring portion 15R protrudes from the outer circumferential surface 15J of the other end side to the radially outside of the cylindrical portion 15E. Namely, the circular ring portion 15R is formed in a circular ring shape. The circular ring portion 15R has an outer circumferential surface in the radial direction that is joined to an inner circumferential surface 16J of the sidewall 16E of the outer housing 16. Accordingly, the outer circumferential surface 15J of the cylindrical portion 15E in the inner housing 15 and the inner circumferential surface 16J of the sidewall 16E in the outer housing 16 face each other at a distance from each other in the radial direction (the radial direction of the low-speed rotation shaft 4). The low-temperature fluid passage 20R is formed between the inner housing 15 and the outer housing 16. In other words, the low-temperature fluid passage 20R is formed in the motor housing 14.

The low-temperature fluid passage forming unit 20 in the present embodiment serves as a surface that forms the low-temperature fluid passage 20R in the inner housing 15 and the outer housing 16. Thus, it can be said that the low-temperature fluid passage forming unit 20 is provided in the motor housing 14. In addition, the outer housing 16 is provided with an introduction port 16M and an exhaust port 16N that are in communication with the low-temperature fluid passage 20R. After the low-temperature fluid (water or the like) introduced through the introduction port 16M into the low-temperature fluid passage 20R cools the inner housing 15 and the outer housing 16, this fluid is discharged through the exhaust port 16N. The low-temperature fluid means a fluid at a temperature at least capable of cooling the motor 1 whose temperature is raised by driving for a predetermined time. After the discharged low-temperature fluid is cooled by a cooling device that is not shown, this fluid is again introduced through the introduction port 16M into the low-temperature fluid passage 20R (see arrows W1).

The motor 1 has a stator 2 that is fixedly attached to the inner circumferential surface of the cylindrical portion 15E in the inner housing 15. The inner housing 15 absorbs heat from the motor 1, thereby cooling the motor 1. In other words, the low-temperature fluid circulating through the low-temperature fluid passage 20R indirectly cools the motor 1. The motor 1 has a rotor 3 that is fixedly attached to the low-speed rotation shaft 4. The low-speed rotation shaft 4 is pivotally supported by the speed increasing machine housing 13 and the bottom wall 16B of the outer housing 16 via bearings.

(Rear Housing 17)

The rear housing 17 is joined to an outer circumferential surface 16T of the bottom wall 16B of the outer housing 16. Within the rear housing 17, an oil pan 17S (oil tank) storing oil is formed. The rear housing 17 and the outer housing 16 are formed as separate bodies and joined to each other in the present embodiment, but may be formed integrally as one unit.

Furthermore, an oil pump 22 is provided within the rear housing 17. The oil pump 22 is drive-coupled to the low-speed rotation shaft 4. The oil pump 22, which is for example a trochoid-type pump, can operate by receiving the rotation force from the motor 1 through the low-speed rotation shaft 4.

(Oil Passage Forming Unit 30)

The oil passage in the present embodiment includes: an oil receiver 13T, through-flow passages 13P, 15P and 16P, a pipeline 18b, through-flow passages 16Q and 17P, an oil pan 17S, a through-flow passage 17Q, an oil pump 22, through-flow passages 17R, 16R, 15Q, and 13Q, and a flow passage within the oil feeding unit 21, each of which will be hereinafter described in detail.

Specifically, the speed increasing machine housing 13 is provided on its inner surface with the oil receiver 13T and the through-flow passages 13P and 13Q. The oil receiver 13T and the through-flow passage 13P are located below the speed increasing machine 5 in the gravity direction while the through-flow passage 13Q is located above the speed increasing machine 5 in the same gravity direction. The through-flow passage 13Q has one end connected to the oil feeding unit 21. The through-flow passage 13P has one end connected to the oil receiver 13T. The inner surface forming the oil receiver 13T and the surface forming the through-flow passages 13P and 13Q, which are provided in the speed increasing machine housing 13, correspond to the oil passage forming unit of the present invention.

The through-flow passages 15P and 15Q are formed in the circular ring portion 15F of the inner housing 15. The through-flow passage 15P is located below the motor 1 in the gravity direction while the through-flow passage 15Q is located above the motor 1 in the same gravity direction. The through-flow passage 15P has one end connected to the other end of the through-flow passage 13P. The through-flow passage 15Q has one end connected to the other end of the through-flow passage 13Q. The surface that forms the through-flow passages 15P and 15Q in the inner housing 15 corresponds to the oil passage forming unit of the present invention.

The through-flow passages 16P, 16Q and 16R are formed in the outer housing 16. The through-flow passages 16P and 16Q are located below the motor 1 in the gravity direction. The through-flow passage 16R is located above the motor 1 in the same gravity direction. The through-flow passage 16P has one end connected to the other end of the through-flow passage 15P. The through-flow passage 16R has one end connected to the other end of the through-flow passage 15Q. The pipeline 18b described later is provided between the through-flow passage 16P and the through-flow passage 16Q. The surface that forms the through-flow passages 16P, 16Q and 16R in the outer housing 16 corresponds to the oil passage forming unit of the present invention.

In addition, as shown in FIGS. 1 and 2, a part of the surface forming the through-flow passage 16P is arranged so as to face a part of the surface forming the low-temperature fluid passage 20R (a part of the inner circumferential surface 16J of the sidewall 16E in the outer housing 16) with a part of the sidewall 16E of the outer housing 16 interposed therebetween. Furthermore, a part of the surface forming the through-flow passage 16R is arranged so as to face a part of the surface forming the low-temperature fluid passage 20R (a part of the inner circumferential surface 16J of the sidewall 16E in the outer housing 16) with a part of the sidewall 16E of the outer housing 16 interposed therebetween. In addition, it can also be said that a part of the surface forming the through-flow passage 16P and a part of the surface forming the through-flow passage 16R are arranged to face to a part of the surface forming the low-temperature fluid passage 20R (a part of the inner circumferential surface 16J of the sidewall 16E in the outer housing 16) such that a part of the sidewall 16E of the outer housing 16 is interposed therebetween. The part of the sidewall 16E can serve as an interposed portion of the present invention.

The through-flow passages 17P, 17Q and 17R are formed in the rear housing 17. The through-flow passages 17P and 17Q are located below the oil pump 22 in the gravity direction. The through-flow passage 17R is located above the oil pump 22 in the same gravity direction. The through-flow passage 17P has one end connected to the other end of the through-flow passage 16Q and the other end connected to the oil pan 17S. The through-flow passage 17R has one end connected to the other end of the through-flow passage 16R.

The oil pump 22 is provided between the through-flow passage 17Q and the through-flow passage 17R. The other end of the through-flow passage 17R and one end of the through-flow passage 17Q are connected to this oil pump 22. The through-flow passage 17Q has the other end connected to the oil pan 17S. The oil pump 22 can suck up the oil stored in the oil pan 17S via the through-flow passage 17Q. The surface forming the through-flow passages 17P, 17Q and 17R and the inner surface of the oil pan 17S, which are provided in the rear housing 17, correspond to the oil passage forming unit of the present invention.

(Oil Cooler 18)

An oil cooler 18 serves to cool the member including the oil passage forming unit. The oil cooler 18 of the present embodiment is formed by liquid-tightly joining a bottomed cylindrical (hollow-shaped) hollow housing 18a having an introduction port 18m and an exhaust port 18n to an outer circumferential surface 16S of the sidewall 16E in the outer housing 16 such that a space S is provided.

In the space S provided between the hollow housing 18a and the outer circumferential surface 16S of the sidewall 16E in the outer housing 16, the pipeline 18b serving as a member including the oil passage forming unit is arranged, and also, the low-temperature fluid is introduced into the space S through the introduction port 18m. In addition, the hollow housing 18a and the outer housing 16 are formed as separate bodies and joined to each other in the present embodiment, but may be formed integrally as one unit.

The pipeline 18b has one end connected to the other end of the through-flow passage 16P. The pipeline 18b has the other end connected to one end of the through-flow passage 16Q. After the low-temperature fluid (water or the like) introduced into the space S through the introduction port 18m cools the pipeline 18b, it is discharged through the exhaust port 18n. After the discharged low-temperature fluid is cooled by a cooling device that is not shown, it is again introduced into the space S through the introduction port 18m (see arrows W2). The pipeline 18b absorbs heat from the oil flowing through the pipeline 18b, thereby cooling the oil. In other words, the low-temperature fluid caused to flow through the space S indirectly cools the oil.

In addition, the oil cooler 18 of the present embodiment is configured to cool the pipeline 18b by causing the low-temperature fluid to circulate through the space S housing the pipeline 18b, but may serve to cool the member including the oil passage forming unit by other methods. For example, the oil cooler 18 may be a metal block, and the like.

(Oil Feeding Unit 21)

Referring to FIG. 2, the oil stored in the oil pan 17S is sucked up through the through-flow passage 17Q by operation of the oil pump 22. After the oil flows through the through-flow passages 17R, 16R, 15Q, and 13Q, it reaches the oil feeding unit 21. The oil feeding unit 21 supplies oil to the speed increasing machine 5. The oil is supplied for lubrication of the speed increasing machine 5, cooling of the speed increasing machine 5, and the like. In this case, the temperature of the oil rises. Then, the oil reaches the oil receiver 13T. After the oil flows through the through-flow passages 13P, 15P and 16P, the pipeline 18b, and the through-flow passages 16Q and 17P, it reaches the oil pan 17S.

(Functions and Effects)

(First Function and Effect)

A part of the surface forming the through-flow passage 16P is arranged so as to face a part of the surface forming the low-temperature fluid passage 20R with a part of the sidewall 16E in the outer housing 16 interposed therebetween. Also, a part of the surface forming the through-flow passage 16R is arranged so as to face a part of the surface forming the low-temperature fluid passage 20R with a part of the sidewall 16E in the outer housing 16 interposed therebetween.

Therefore, the heat of the oil flowing through each of the through-flow passages 16P and 16R is transmitted through a part of the sidewall 16E of the outer housing 16 to the low-temperature fluid that flows through the low-temperature fluid passage 20R, so that the oil is cooled.

(Second Function and Effect)

The oil pan 17S is formed in the rear housing 17 joined to the outer circumferential surface 16T of the bottom wall 16B in the outer housing 16. Accordingly, space-saving can be achieved.

Furthermore, the low-temperature fluid (water or the like) flowing through the low-temperature fluid passage 20R cools the rear housing 17 through the outer housing 16 (outer circumferential surface 16T). Accordingly, the oil stored in the oil pan 17S can be heat-exchanged through the rear housing 17 and the outer housing 16 with the low-temperature fluid flowing through the low-temperature fluid passage 20R, and thus can be cooled by the low-temperature fluid flowing through the low-temperature fluid passage 20R.

(Third Function and Effect)

The oil passage forming unit 30 is formed in: the motor housing 14 cooled by the low-temperature fluid flowing through the low-temperature fluid passage 20R; and the speed increasing machine housing 13 and the rear housing 17 that are joined to the motor housing 14.

Consequently, not only the motor housing 14 is cooled by the low-temperature fluid flowing through the low-temperature fluid passage 20R, but also the speed increasing machine housing 13 and the rear housing 17 are indirectly cooled by cooling the motor housing 14. Accordingly, the oil passage forming unit 30 is entirely cooled.

Furthermore, space saving can be achieved as compared with the configuration in which a member having the oil passage forming unit 30 (for example, a pipe-shaped member) is arranged on the housing 10.

(Fourth Function and Effect)

The space S in the oil cooler 18 is formed by a part of the outer circumferential surface 16S of the sidewall 16E in the outer housing 16 while the low-temperature fluid passage 20R is formed by the inner circumferential surface 16J of the sidewall 16E in the outer housing 16. In other words, a part of the outer circumferential surface 16S of the sidewall 16E in the outer housing 16 is arranged so as to face the inner circumferential surface 16J of the sidewall 16E in the outer housing 16 with a part of the sidewall 16E of the outer housing 16 interposed therebetween.

Therefore, the low-temperature fluid within the space S and the low-temperature fluid within the low-temperature fluid passage 20R are heat-exchanged with each other through a part of the sidewall 16E of the outer housing 16. Accordingly, for example, even when the temperature of the low-temperature fluid within the low-temperature fluid passage 20R rises, the low-temperature fluid within the low-temperature fluid passage 20R can be cooled by the low-temperature fluid within the space S. Furthermore, since the space S in the oil cooler 18 is formed by a part of the outer circumferential surface of the sidewall 16E in the outer housing 16, space-saving can be achieved.

Second Embodiment

Figure 3:
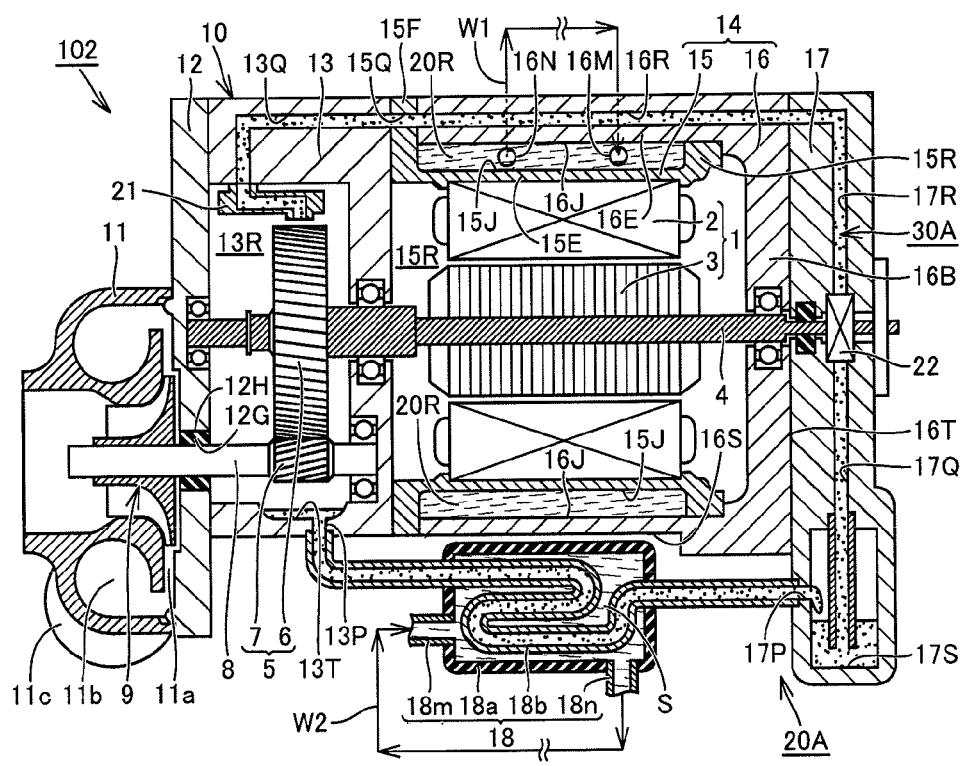
FIG. 3 is a cross-sectional view showing a compressor in the second embodiment.

Referring to FIG. 3, a compressor 102 in the second embodiment will be hereinafter described. The compressor 102 and the compressor 101 (the first embodiment) are different from each other in that the oil cooler 18 is arranged so as not to come in contact with the outer circumferential surface 16S of the sidewall 16E in the outer housing 16. The first and second functions and effects in the first embodiment can be achieved also in the present embodiment.

Third Embodiment

Figure 4:
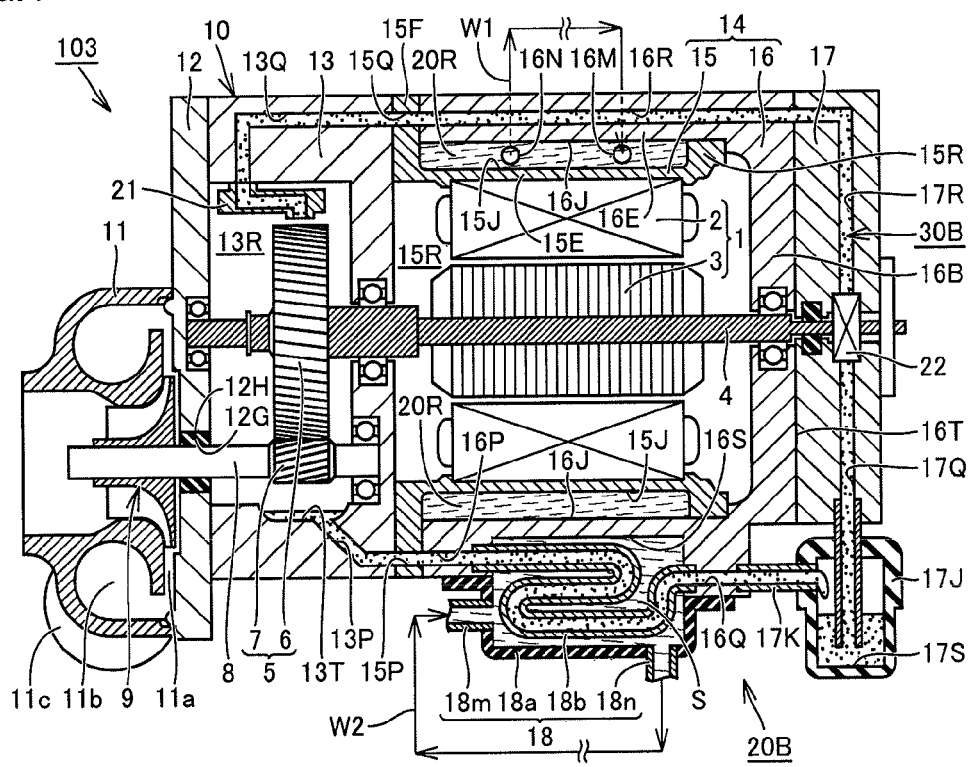
FIG. 4 is a cross-sectional view showing a compressor in the third embodiment.

Referring to FIG. 4, a compressor 103 in the third embodiment will be hereinafter described. The compressor 103 and the compressor 101 (the first embodiment) are different from each other in that the housing 17J forming the oil pan 17S is arranged so as not to come in contact with each of the outer housing 16 and the rear housing 17. The first and fourth functions and effects in the first embodiment can be achieved also in the present embodiment.

Fourth Embodiment

Figure 5:
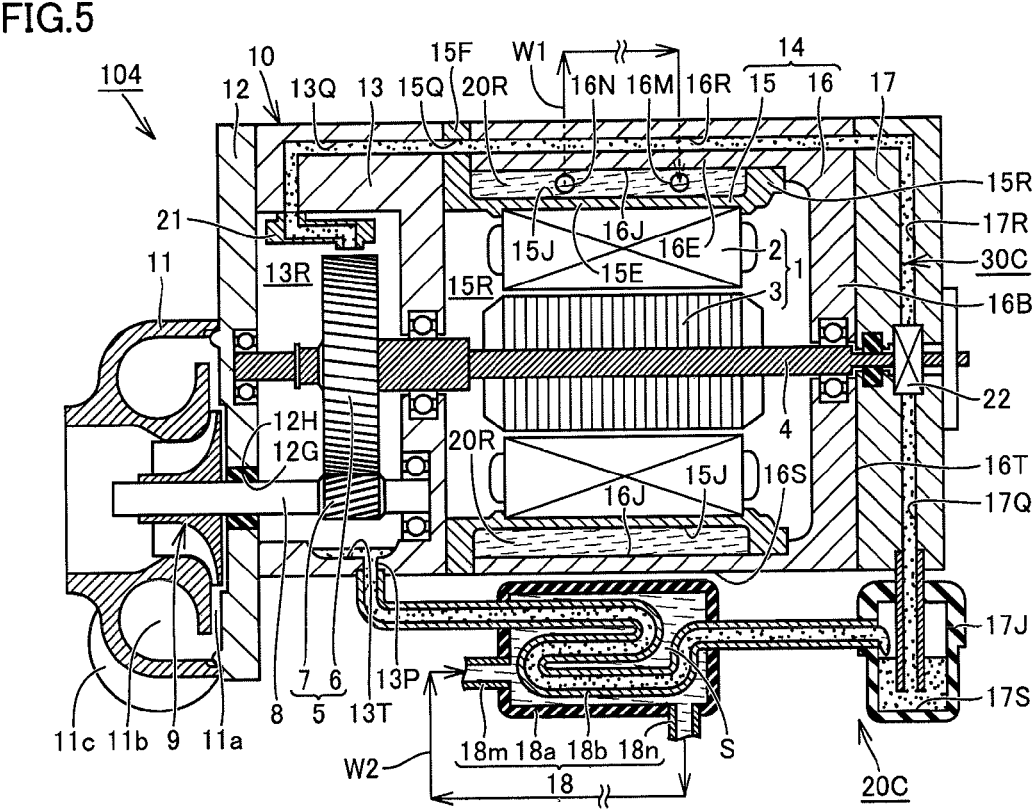
FIG. 5 is a cross-sectional view showing a compressor in the fourth embodiment.

Referring to FIG. 5, a compressor 104 in the fourth embodiment will be hereinafter described. The compressor 104 and the compressor 101 (the first embodiment) are different from each other in that the oil cooler 18 is arranged so as not to come in contact with the outer circumferential surface 16S of the outer housing 16, and also in that the housing 17J forming the oil pan 17S is arranged so as not to come in contact with each of the outer housing 16 and the rear housing 17. The first function and effect in the first embodiment can be achieved also in the present embodiment.

Fifth Embodiment

Figure 6:
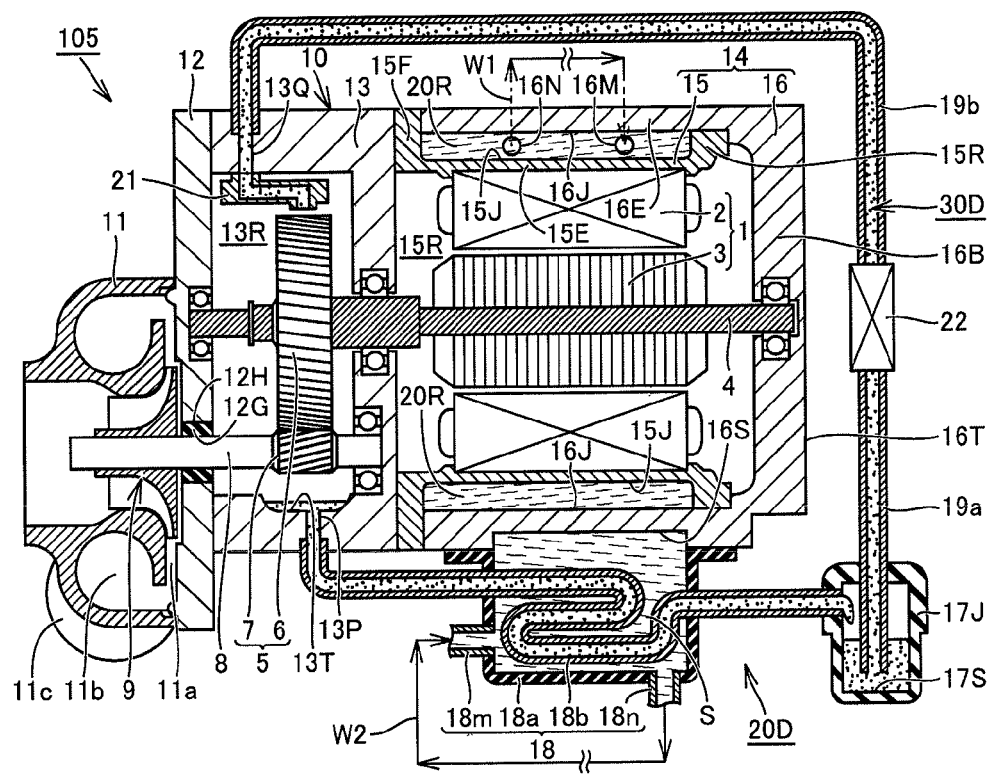
FIG. 6 is a cross-sectional view showing a compressor in the fifth embodiment.

Referring to FIG. 6, a compressor 105 in the fifth embodiment will be hereinafter described. The compressor 105 and the compressor 101 (the first embodiment) are different from each other in that the rear housing 17 is not included, and also in that the housing 17J forming the oil pan 17S is arranged so as not to come in contact with the outer housing 16. The fourth function and effect in the first embodiment can be achieved also in the present embodiment.

Other Embodiments

In each of the above-described embodiments, the low-temperature fluid passage forming unit 20 is formed in the motor housing 14, but a member having a low-temperature fluid passage forming unit (for example, a pipe-shaped member having the low-temperature fluid passage 20R) may be provided on the housing 10 so as to cool the motor 1, or a member having the low-temperature fluid passage forming unit 20 and a member having the oil passage forming unit 30 (for example, a pipe-shaped member having an oil passage) may be joined to each other. In this case, a part of the member having the low-temperature fluid passage forming unit 20 and a part of the member having the oil passage forming unit 30, which are interposed between the low-temperature fluid passage forming unit 20 in the member having the low-temperature fluid passage forming unit 20 (the surface forming the low-temperature fluid passage) and the oil passage forming unit 30 in the member having the oil passage forming unit 30 (the surface forming the oil passage), correspond to an interposed portion of the present invention.

Although each of the above-described embodiments has been described based on the compressor including the speed increasing machine 5, the speed increasing machine 5 is not an indispensable component. In the case where the speed increasing machine 5 is not used, the oil feeding unit 21 supplies oil to various types of bearings serving as a device incorporated in the compressor, for example. The oil feeding unit 21 may supply oil not only to various types of bearings but also to the motor 1. Oil may indirectly cool the motor 1 through a housing (a cooling pipe) and the like, or may directly cool the motor 1 in such a manner that the motor 1 is immersed therein.

Although each of the above-described embodiments has been described based on the compressor including the impeller 9, the impeller 9 is not an indispensable component. The idea disclosed in each of the above-described embodiments can be applicable to a compression mechanism as long as it is driven by the motor 1 even if it is of a scroll type or of a piston type (swash plate type).

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A compressor comprising:
  a compression mechanism compressing a fluid;
  a motor driving the compression mechanism; and
  a housing that houses the compression mechanism and the motor,
  the compressor including
  a low-temperature fluid passage forming unit having a surface forming a low-temperature fluid passage in which a low-temperature fluid flows and provided in the housing so as to cool the motor, and
  an oil passage forming unit having a surface forming an oil passage through which oil supplied into the housing flows,
  at least a part of the oil passage forming unit being arranged so as to face the low-temperature fluid passage forming unit with an interposed portion interposed therebetween such that the oil is cooled by heat exchange with the low-temperature fluid.

2. The compressor according to claim 1, further comprising an oil cooler cooling the oil that flows through the oil passage.

3. The compressor according to claim 2, wherein
  the oil cooler has a hollow housing into which the low-temperature fluid is supplied, and
  a part of the oil passage forming unit is provided within the hollow housing.

4. The compressor according to claim 1, further comprising an oil pan storing the oil, wherein
  the oil pan is provided in the housing.

5. The compressor according to claim 1, wherein at least a part of the low-temperature fluid passage and at least a part of the oil passage are formed in the housing.

6. The compressor according to claim 1, further comprising a speed increasing machine that is drive-coupled to the motor and transmits motive power of the motor to the compression mechanism, wherein
  the oil is supplied to the speed increasing machine.

7. The compressor according to claim 1, further comprising an oil pump that is drive-coupled to the motor.

8. The compressor according to claim 1, wherein the oil passage forming unit is provided in the housing, and the interposed portion is a part of the housing.

9. A compressor comprising:
  a compression mechanism compressing a fluid;
  a motor driving the compression mechanism; and
  a housing that houses the compression mechanism and the motor,
  the compressor including
  a low-temperature fluid passage forming unit having a surface forming a low-temperature fluid passage in which a low-temperature fluid flows and provided in the housing so as to cool the motor,
  an oil passage forming unit having a surface forming an oil passage through which oil supplied into the housing flows, and
  an oil cooler cooling the oil that flows through the oil passage,
  the oil cooler being provided in the housing.

* * * * *